(12) United States Patent
Kulkarni et al.

(10) Patent No.: US 7,950,529 B2
(45) Date of Patent: May 31, 2011

(54) SEPARATION MEMBRANE MADE FROM BLENDS OF POLYIMIDES WITH POLYIMIDAZOLES

(75) Inventors: Sudhir S. Kulkarni, Wilmington, DE (US); Dean W. Kratzer, Warwick, MD (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 246 days.

(21) Appl. No.: 12/241,679

(22) Filed: Sep. 30, 2008

(65) Prior Publication Data

US 2010/0078386 A1 Apr. 1, 2010

(51) Int. Cl.
*B01D 71/62* (2006.01)
*B01D 71/64* (2006.01)
*B01D 63/02* (2006.01)

(52) U.S. Cl. .................. 210/500.39; 210/500.23; 96/14; 96/10; 95/149; 95/241

(58) Field of Classification Search .................. None
See application file for complete search history.

(56) References Cited

U.S. PATENT DOCUMENTS

| | | | |
|---|---|---|---|
| 4,020,142 A | 4/1977 | Davis et al. |
| 4,705,540 A | 11/1987 | Hayes |
| 4,880,442 A | 11/1989 | Hayes |
| 5,015,270 A | 5/1991 | Ekiner et al. |
| 5,085,676 A | 2/1992 | Ekiner et al. |
| 5,635,067 A | 6/1997 | Macheras |
| 6,946,015 B2 | 9/2005 | Jorgensen et al. |
| 6,997,971 B1 | 2/2006 | Young et al. |
| 7,018,445 B2 | 3/2006 | Simmons et al. |
| 7,393,383 B2 | 7/2008 | Ekiner et al. |

OTHER PUBLICATIONS

Barsema, et al., "Preparation and Characterization of Highly Selective Dense and Hollow Fiber Asymmetric Membranes Based on BTDA-TDI/MDI Co-Polyimide," Journal of Membrane Science, 216 (2003), pp. 195-205.
Bos, et al., "Suppression of Gas Separation Membrane Plasticization by Homogeneous Polymer Blending," AIChE Journal, vol. 47, No. 5, May 2001, pp. 1088-1093.
Chung, et al., "Asymmetric Hollow Fiber Membranes Prepared from Miscible Polybenzimidazole and Polyetherimide Blends," Journal of Membrane Science, 147 (1998), pp. 35-47.
Chung, et al., "Enhanced Matrimid Membranes for Pervaporation by Homogenous Blends with Polybenzimidazole (PBI)," Journal of Membrane Science, 271 (2006), pp. 221-231.
Wang, et al., "Dehydration of Tetrafluoropropanol (TFP) by Pervaporation Via Novel PBI/BTDA-TDI/MDI Co-Polyimide (P84) Dual-Layer Hollow Fiber Membranes," Journal of Membrane Science, 287, (2007), pp. 60-66.

*Primary Examiner* — Krishnan S Menon
(74) *Attorney, Agent, or Firm* — Christopher J. Cronin

(57) ABSTRACT

A membrane for fluid separation made of a blend of at least a polyimide polymer and a polyimidazole polymer.

26 Claims, 1 Drawing Sheet

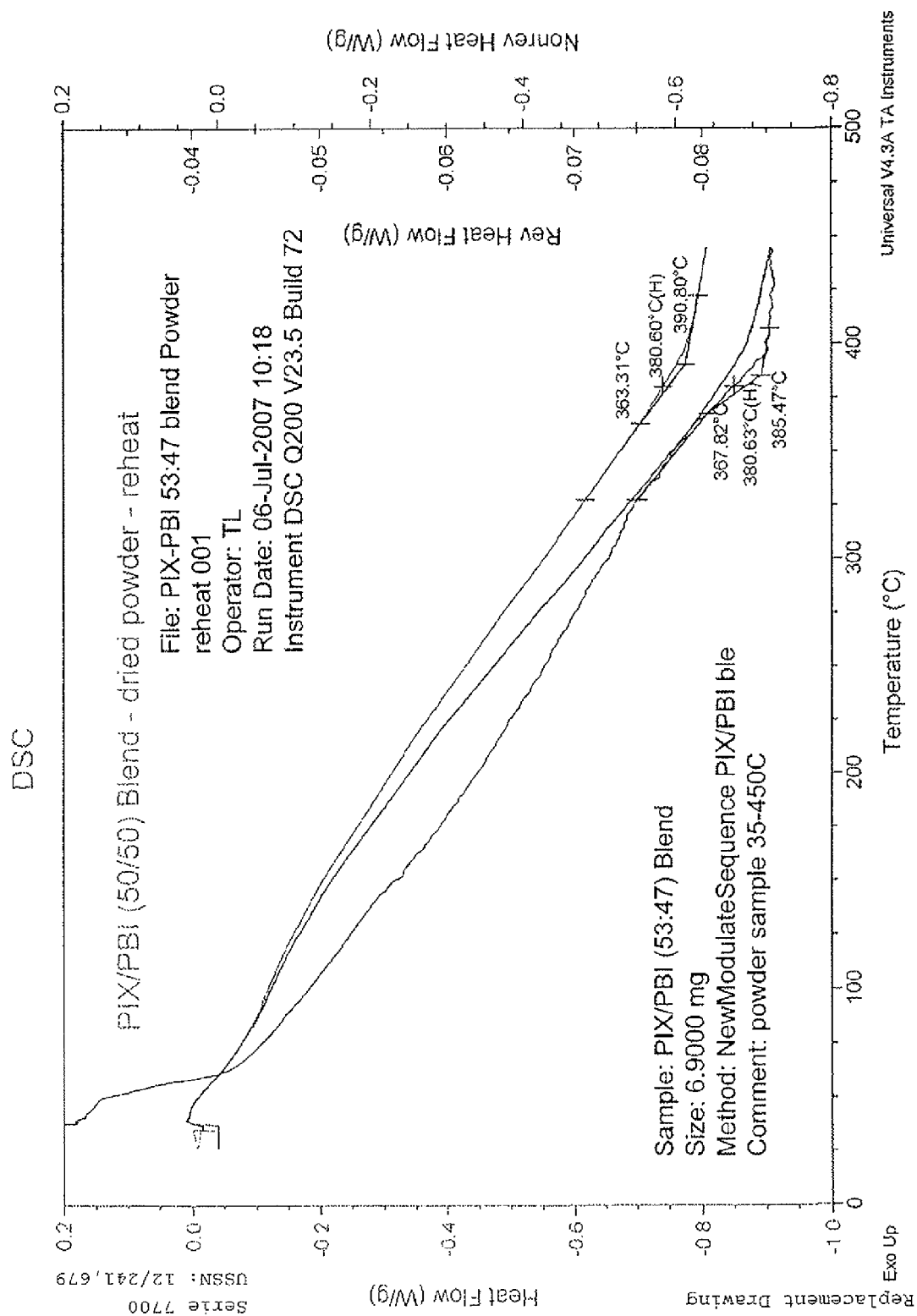
FIG

SEPARATION MEMBRANE MADE FROM BLENDS OF POLYIMIDES WITH POLYIMIDAZOLES

CROSS-REFERENCE TO RELATED APPLICATIONS

None.

BACKGROUND

Permselective membranes for fluid separation are known and used commercially in applications such as the production of oxygen-enriched air, production of nitrogen-enriched-air for inerting and blanketing, separation of carbon dioxide from methane for the upgrading of natural gas streams, separation of carbon dioxide from nitrogen from combustion exhaust gases, dehydration of alcohols, and the separation of hydrogen from various petrochemical and oil refining streams. For certain fluid streams, one or more components or minor contaminants may exhibit a strong interaction with the material of the membrane, which can plasticize the membrane. This can result in reduced productivity and selectivity and ultimately loss in membrane performance. Furthermore, some membrane materials may offer resistance to the interaction with contaminants but suffer from poor mechanical properties, thereby resulting in membrane failure when exposed to high membrane differential pressures and high temperatures. Other materials may not be capable of processing into membranes of the desired configuration (such as a hollow fiber membrane). Thus, a membrane having a good balance of high productivity and selectivity for the fluids of interest, persistently good separation performance despite long-term contact with aggressive process composition, pressure, and temperature conditions, and being made of a material having the ability to be processed into a wide variety of membrane configurations is highly desired.

Polymeric blending has traditionally been thought to be either problematic or of no benefit in the membrane field. This is primarily because different polymers are generally not miscible with one another, and for those few polymers that are miscible, a blend of the miscible polymers offers limited advantages for various reasons, including difficulty in blending, poor mechanical properties, or limited range of fluid transport properties.

The references discussed below describe separation membranes known in the art and disclose information relevant to production of oxygen-enriched air, production of nitrogen-enriched-air for inerting and blanketing, separation of carbon dioxide from methane for the upgrading of natural gas streams, separation of carbon dioxide from nitrogen from combustion exhaust gases, dehydration of alcohols, and the separation of hydrogen from various petrochemical and oil refining streams. However, these references suffer from one or more of the disadvantages discussed above.

U.S. Pat. No. 4,705,540 discloses highly permeable polyimide gas separation membranes prepared from phenylene diamines having substituents on all positions ortho to the amine functions and a rigid dianhydride or mixtures thereof, specifically pyromellitic dianhydride (PMDA) and 4,4'-(hexafluoroisopropylidene)-bis (phthalic anhydride) (6FDA). These polyimides form membranes with high gas permeabilities but fairly low permselectivities. These polyimides are also sensitive to various organic solvents.

U.S. Pat. No. 4,880,442 discloses highly permeable polyimide gas separation membranes prepared from phenylene diamines having substituents on all positions ortho to the amine functions and essentially non-rigid dianhydrides. These polyimides again exhibit high gas permeabilities, but once again low permselectivities.

Bos et al., AIChE Journal, 47,1088 (2001), reports that polymer blends of two polyimides, Matrimid® 5218 polyimide (3,3',4,4'-benzophenone tetracarboxylic dianhydride and diaminophenylindane) and copolyimide P84 [copolyimide of 3,3',4,4'-benzophenone tetracarboxylic dianhydride and 80% toluenediisocyanate/20% 4,4'-methylene-bis(phenylisocyanate)], can increase the stability of the membrane against carbon dioxide plasticization when compared to the plain Matrimid® 5218 membrane.

U.S. Pat. No. 5,635,067 discloses a fluid separation membrane based on a blend of two distinct polyimides: P84 and Matrimid® 5218 polyimide. U.S. Pat. No. 7,018,445 also discloses fluid separation membrane based on a blend of polyimide: P84 with other polyimides. U.S. Pat. No. 7,393,383 discloses a fluid separation membrane based on a blend of P84 with polyamides or poly-imide-amides.

Barsema et al. (Journal of Membrane Science, 216 (2003), p 195-205) reports the permeation performance of dense film and asymmetric hollow fiber membranes made from P84.

Chung and Xu (Journal of Membrane Science 147, (1998) p 35-47) describe solution spinning of hollow fibers based on a miscible blend of PBI (2,2'-(m-phenylene)-5,5'-bibenzimadazole) and Ultem® 1010 polyetherimide. The performance of the spun fibers indicates non-integral separating layers so that even after post-treatment with silicone rubber (SiR) the membranes have unattractively low gas selectivity ($O_2/N_2$~2 and $H_2/N_2$~21).

Chung et al. (Journal of Membrane Science 271, (2006) p 221-231) show that incorporation of small amounts of PBI (3-17%) into Matrimid® 5218 polyimide increases temperature stability and selectivity of the blend film for pervaporation dehydration of t-butanol. PBI and Matrimid are reported to be miscible only at PBI compositions <18%. No gas separation data are reported for this system.

Wang et al. (Journal of Membrane Science 287 (2007) p 60-66) discusses solution spinning of a composite fiber comprising a distinct PBI-based outer sheath supported by a P84®-based (BTDA-TDI:MDI) core. The PBI sheath/P84 core composite fiber is claimed to have good performance for pervaporation dehydration of tetrafluoropropanol. No gas separation performance is reported. Fibers made from blends of PBI and P84 are not disclosed.

U.S. Pat. Nos. 6,946,015 and 6,997,971 claim increased permeance and selectivity for crosslinked PBI. The permselective PBI layer is supported on a microporous metal for high temperature gas separation. Such a membrane is relatively expensive to fabricate compared to an extruded polymeric hollow fiber.

Accordingly, it is highly desirable to create a membrane that can be used commercially in applications such as the production of oxygen-enriched air, production of nitrogen-enriched-air for inerting and blanketing, separation of carbon dioxide from methane for the upgrading of natural gas streams, separation of carbon dioxide from nitrogen from combustion exhaust gases, dehydration of alcohols, and the separation of hydrogen from various petrochemical and oil refining streams. The desired membranes should exhibit a resistance to interaction of the material with the process and the resulting plasticizing of the membrane. Furthermore, membranes should have superior mechanical properties to allow the use of the membranes in high differential pressure applications, and be made of a material capable of being processed into the desired configuration (such as a hollow fiber membranes) Thus, membranes with a good balance of high productivity and selectivity for the fluids of interest, and persistently good separation performance despite long-term contact with aggressive process composition, pressure and temperature conditions are desired.

SUMMARY

The membranes of the current invention can be used commercially in applications such as:

- the production of oxygen-enriched air;
- the production of nitrogen-enriched-air for inerting and blanketing;
- the separation of carbon dioxide and/or other acid gases such as hydrogen sulfide from methane for the upgrading of natural gas streams;
- the separation of carbon dioxide from nitrogen;
- the separation of hydrogen from methane in various oil refining streams;
- the separation of hydrogen from carbon monoxide in various petrochemical streams;
- dehydration of alcohols or
- pervaporative separations involving organic solvents The membranes of the invention exhibit a resistance to interaction of the material with the process and the resulting plasticizing of the membrane. The materials of the invention also have superior mechanical properties, resulting in superior performance when exposed to high membrane differential pressures and high process temperatures. Moreover, the membranes of the invention are capable of processing into membranes of a wide variety of desired configurations (such as a hollow fiber membrane). Furthermore, the membranes of the invention have a good balance of high productivity and selectivity for the fluids of interest, as well as persistently good separation performance despite long-term contact with aggressive process composition, pressure and temperature conditions.

This invention is particularly useful for separating hydrogen from methane such as in a process stream at an oil refinery. The invention is also particularly useful for separating hydrogen from carbon monoxide such as in syngas or in a process stream at a petrochemical plant. Alternatively, this invention is useful for removing carbon dioxide and other acid gases such as hydrogen sulfide from raw natural gas to produce natural gas of pipeline quality. In another alternative, this invention is useful for removing water from C1-C4 alcohols such as methanol, ethanol, propanol, isopropanol, and butanol. In this manner, the invention can be useful for economical purification of the organic or for overcoming an azeotropic composition. In yet another alternative, this invention is useful for separating unsaturated C2-C4 hydrocarbons (such as ethylene, propylene, or butylene) from branched or straight chain paraffins (such as ethane, propane, or butane) as found in various process streams in oil refineries and petrochemical plants.

Thus, there is provided a membrane for fluid separation made of a material comprising a blend of a polyimide polymer and a polyimidazole polymer. The polyimide polymer comprises a plurality of repeating units represented by formula (I):

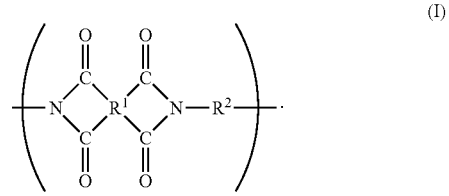
(I)

Each $R^2$ is independently selected from the group consisting of formula (A), formula (B), and formula (C):

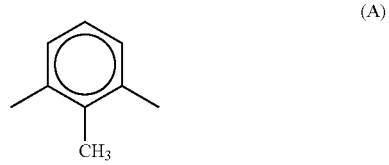
(A)

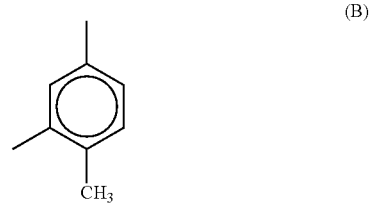
(B)

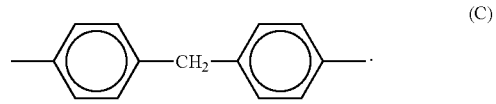
(C)

Each $R^1$ is independently selected from the group consisting of formula (Q), formula (S), and formula (T):

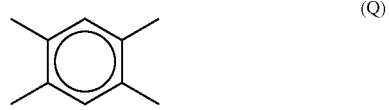
(Q)

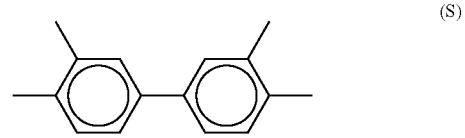
(S)

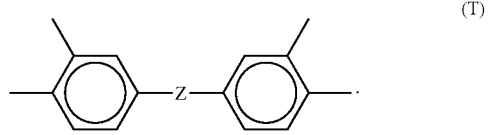
(T)

Each Z is independently selected from the group consisting of formula (L), formula (M), and formula (N):

(L)

(M)

-continued

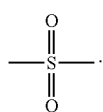
(N)

The polyimidazole polymer comprises repeating units selected from the group consisting of formula (IIa) and formula (IIb):

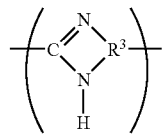
(IIa)

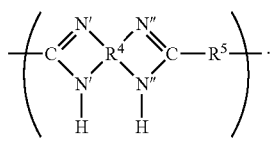
(IIb)

$R^3$ of formula (IIa) is an aromatic group. The two nitrogen atoms of formula (IIa) are bonded to adjacent carbon atoms of $R^3$. $R^4$ of formula (IIb) is an aromatic group. The two N' atoms are bonded to one set of adjacent carbon atoms of $R^4$. The two N" atoms are bonded to another set of adjacent carbon atoms of $R^4$. $R^5$ of formula (IIb) is an aromatic, aliphatic or heterocyclic group.

The disclosed membrane may include one or more of the following aspects:
  the polyimidazole comprises repeating units of formula IIb, $R^4$ is a biphenyl group, and $R^3$ is a phenyl group.
  said polyimide polymer comprises repeating units of formula (Ia)

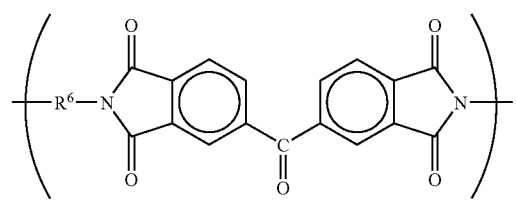
(Ia)

wherein each $R^1$ is independently selected from the group consisting of said formula (A), said formula (B), and said formula (C).
  said polyimide polymer comprises repeating units of formula (Ia) wherein $R^6$ in said polyimide polymer of formula (Ia) comprises about 10-25% of the repeating unit of formula (A), about 55-75% of the repeating unit of formula (B), and about 20-40% of the repeating unit of formula (C).
  said polyimide polymer comprises repeating units of formula (Ia) wherein $R^6$ in said polyimide polymer of formula (Ia) comprises about 16% of the repeating unit of formula (A), about 64% of the repeating unit of formula (B), and about 20% of the repeating unit of formula (C).
  said polyimide polymer comprises repeating units of formula (Ib)

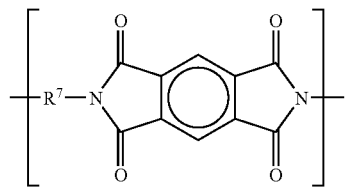
(Ib)

wherein each $R^7$ is independently selected from the group consisting of said formula (A) and said formula (B).
  said polyimide polymer comprises a plurality of repeating units of formula (Ia) and a plurality of repeating units of formula (Ib) wherein:
    said repeating units of formula (Ib) constitute about 1-99% of a total of the repeating units of formulae (Ia) and (Ib);
    1-99% of the $R^6$s in said formula Ia is the structure of said formula (A) and 99-1% of the $R^6$s in said formula Ia is the structure of said formula (B) such that the total of $R^6$s that are the structures of formulae (A) or (B) is 100%; and
    1-99% of the $R^7$s in said formula Ib is the structure of said formula (A) and 99-1% of the $R^7$s in said formula Ib is the structure of said formula (B) such that the total of $R^7$s that are the structures of said formulae (A) or (B) is 100%.
  10-30% of the $R^6$s in said formula Ia is the structure of said formula (A) and 90-70% of the $R^6$s in said formula Ia is the structure of said formula (B) such that the total of $R^6$s that are the structures of formulae (A) or (B) is 100%, wherein:
    10-30% of the $R^7$s in said formula Ib is the structure of said formula (A) and 90-70% of the $R^7$s in said formula Ib is the structure of said formula (B) such that the total of $R^7$s that are the structures of said formulae (A) or (B) is 100%; and
    said repeating units of formula (Ib) constitute about 30-50% of a total of the repeating units of formulae (Ia) and (Ib).
  about 20% of the $R^6$s in said formula Ia is the structure of said formula (A) and about 80% of the $R^6$s in said formula Ia is the structure of said formula (B) such that the total of $R^6$s that are the structures of formulae (A) or (B) is 100%, wherein
    about 20% of the $R^7$s in said formula Ib is the structure of said formula (A) and about 80% of the $R^7$s in said formula Ib is the structure of said formula (B) such that the total of $R^7$S that are the structures of said formulae (A) or (B) is 100%; and
    said repeating units of formula (Ib) constitute about 40% of a total of the repeating units of formulae (Ia) and (Ib).
  a mass ratio of said polyimide polymer to said polyimidazole is at least about 1.0.
  a mass ratio of said polyimide polymer to said polyimidazole is at least about 2.0.
  said membrane comprises between about 20-95 % mass of said polyimide polymer.
  said polyimide polymer is the polycondensation reaction product of an aromatic diisocyanate and a dianhydride, the aromatic diisocyanate being selected from the group consisting of 2,4-toluenediisocyanate, 2,6-toluenediisocyanate, and 4,4'-methylene-bis(phenylisocyanate), the dianhydride being selected from the group consisting of pyromellitic dianhydride, benzophenonetetracarboxylic dianhydride, 3,3',4,4'-diphenylsulfone tetracarboxylic dianhydride, 3,3',4,4'-biphenyl tetracarboxylic dianhydride, and mixtures thereof.

said membrane has a configuration selected from the group consisting of an asymmetric membrane, a uniformly dense membrane, a hollow fiber membrane, and a composite membrane.

the membrane is configured as a plurality of composite hollow fibers, each of the fibers having a supporting core layer surrounded by a fluid-separating sheath layer, the fluid-separating sheath layer comprised of the material made of the blend of the polyimide and polyimidazole.

There is also disclosed a method of separating one or more fluids from a fluid mixture comprising the following steps. The above disclosed fluid separation membrane is provided. A fluid mixture is contacted with a first side of said fluid separation membrane thereby causing a preferentially permeable fluid of said fluid mixture to permeate said fluid separation membrane faster than a less preferentially permeable fluid to form a permeate fluid mixture enriched in said preferentially permeable fluid on a second side of said fluid separation membrane and a retentate fluid mixture depleted in said preferentially permeable fluid on said first side of said fluid separation membrane. Said permeate fluid mixture and said retentate fluid mixture are separately withdrawn from the membrane.

The disclosed method may include one or more of the following aspects:

said polyimidazole polymer is 2,2'-(m-phenylene)-5,5'-bibenzimadazole.

a pressure gradient across said membrane is in the range of about 20 to about 2000 psi.

a membrane operating temperature is >50° C.

the fluid mixture comprises air, wherein the permeate fluid is enriched in oxygen and the retentate fluid mixture is depleted in oxygen.

the fluid mixture comprises a mixture of carbon dioxide and methane, wherein the permeate fluid is enriched in carbon dioxide and the retentate fluid mixture is depleted in carbon dioxide.

the fluid mixture comprises a mixture of carbon dioxide and nitrogen, wherein the permeate fluid is enriched in carbon dioxide and the retentate fluid mixture is depleted in carbon dioxide.

the fluid mixture comprises a mixture of hydrogen and methane, wherein the permeate fluid is enriched in hydrogen and the retentate fluid mixture is depleted in hydrogen.

the fluid mixture comprises a mixture of hydrogen and carbon monoxide, wherein the permeate fluid is enriched in hydrogen and the retentate fluid mixture is depleted in hydrogen.

the fluid mixture comprises a mixture of water and an C1-C4 alcohol selected from the group consisting of ethanol, propanol, isopropanol, butanol, and mixtures thereof, wherein the permeate fluid is enriched in water and the retentate fluid mixture is depleted in water.

the fluid mixture comprises a mixture of an unsaturated $C_2$-$C_4$ hydrocarbon and a branched or straight chain $C_2$-$C_4$ paraffin, wherein the permeate fluid is enriched in the unsaturated hydrocarbon and the retentate fluid mixture is depleted in the unsaturated hydrocarbon.

BRIEF DESCRIPTION OF THE PREFERRED EMBODIMENTS

The FIGURE is a Differential Scanning Calorimetry graph for a film of a 53:47 blend of PBI:P84.

DETAILED DESCRIPTION OF THE PREFERRED EMBODIMENTS

Accordingly, the present invention provides a membrane for fluid separation made of a material comprising a blend of at least one polyimide polymer, with at least one polyimidazole polymer. Other components can be present in the blend such as, processing aids, chemical and thermal stabilizers and the like, provided that they do not significantly adversely affect the separation performance of the membrane. The membranes of the current invention exhibit an excellent combination of high permselectivity and permeability for the separation of gases. Furthermore, the membranes exhibit superior thermal and mechanical properties, which enables the membranes to withstand high membrane differential pressures and high temperatures as required of some aggressive applications.

The polyimide polymer of the invention contains the repeating units as shown in the following formula (I):

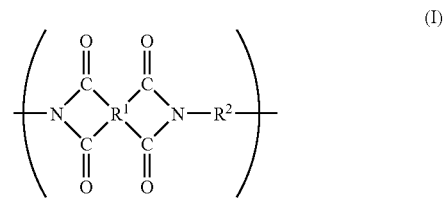

wherein each $R^2$ of formula (I) is independently selected from the group consisting of formula (A), formula (B), and formula (C):

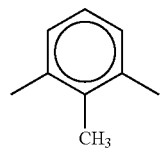

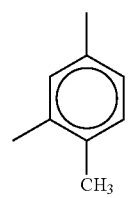

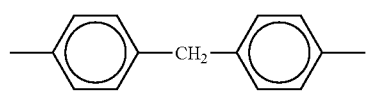

wherein each $R^1$ of formula (I) is independently selected from the group consisting of formula (Q), formula (S), and formula (T):

(Q)

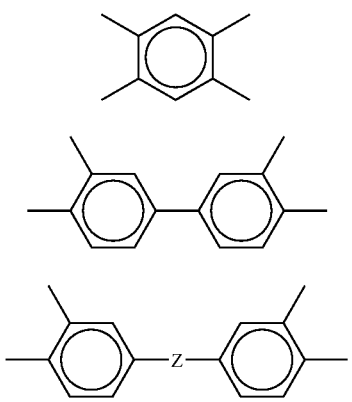

(S)

(T)

wherein each Z of formula (T) is independently selected from the group consisting of formula (L), formula (M), and formula (N):

(L)

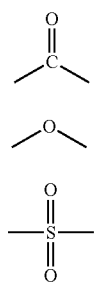

(M)

(N)

In one embodiment, the polyimide has repeating units as shown in formula (Ia):

(Ia)

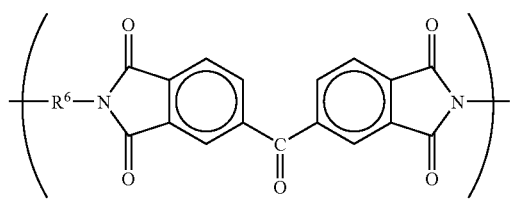

In this embodiment, moiety $R^6$ of formula (Ia) is preferably of formula (A) in 0-100% of the repeating units, of formula (B) in 0-100% of the repeating units, and of formula (C) in a complementary amount totaling 100% of the repeating units. A polymer of this structure is available from HP Polymer GmbH under the trade name P84. P84 is believed to have repeating units according to formula (Ia) in which $R^6$ is formula (A) in about 16% of the repeating units, formula (B) in about 64% of the repeating units and formula (C) in about 20% of the repeating units. P84 is believed to be derived from the condensation reaction of benzophenone tetracarboxylic dianhydride (BTDA, 100 mole %) with a mixture of 2,4-toluene diisocyanate (2,4-TDI, 64 mole %), 2,6-toluene diisocyanate (2,6-TDI, 16 mole %) and 4,4-methylene-bis (phenylisocyanate) (MDI, 20 mole %).

In another embodiment, the polyimide comprises repeating units of formula (Ib):

(Ib)

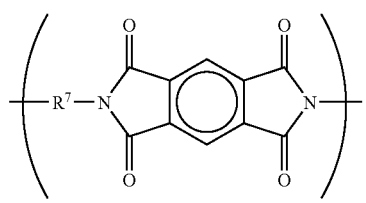

wherein each $R^7$ of formula (Ib) is of formula (A) in about 0-100% of the repeating units, and of formula (B) in a complementary amount totaling 100% of the repeating units.

In yet another embodiment, the polyimide is a copolymer comprising repeating units of both formulae (Ia) and (Ib) in which units of formula (Ib) constitute about 1-99% of the total repeating units of formulas (Ia) and (Ib). A polymer of this structure is available from HP Polymer GmbH under the trade name P84HT. P84HT is believed to have repeating units according to formulas (Ia) and (Ib) in which the formula (A) is $R^6$ or $R^7$ in about 20% of the repeating units and formula (B) is $R^6$ or $R^7$ in about 80% of the repeating units, and in which repeating units of formula (Ib) constitute about 40% of the total of repeating units of formulas (Ia) and (Ib). P84HT is believed to be derived from the condensation reaction of benzophenone tetracarboxylic dianhydride (BTDA, 60 mole %) and pyromellitic dianhydride (PMDA, 40 mole %) with 2,4-toluene diisocyanate (2,4-TDI, 80 mole %) and 2,6-toluene diisocyanate (2,6-TDI, 20 mole %).

The polyimidazole polymer comprises repeating units of the following formula (IIa) or (IIb)

(IIa)

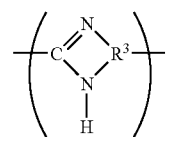

(IIb)

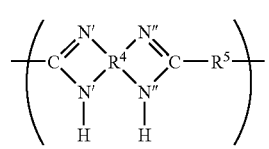

In the aromatic polyimidazoles depicted by formula (IIa), $R^3$ is an aromatic nucleus where the two N atoms are located on adjacent (ortho) carbon atoms on the aromatic nucleus. As disclosed in U.S. Pat. No. 4,020,142 the aromatic polyimidazoles having the repeating units of formula (IIa) may be prepared by self-condensation of a trifunctional aromatic compound containing a single set of ortho-disposed diamino substuents and a carboxylate ester substituent. An example of this type of polymer is poly-2,5(6)-benzimidazole prepared by the auto-condensation of phenyl-3,4-diamino benzoate.

In the aromatic polyimidazoles depicted by formula IIb, $R^4$ is an aromatic nucleus with two pairs of nitrogen atoms (one pair of N' and one pair of N") where the two N' atoms are located on adjacent (ortho) carbon atoms on the aromatic nucleus and the two N" atoms are located on a different set of adjacent (ortho) carbon atoms on the aromatic nucleus. $R^5$ can be an aromatic, aliphatic or heterocyclic group. Preferably, $R^5$ is at least one aromatic ring or a heterocyclic ring. As disclosed in the aforementioned patent, the aromatic polybenzimidazoles having the repeating units of formula (IIb) may be prepared by condensing an aromatic tetraamine compound containing a pair of ortho-diamino substituents on the aromatic nucleus with a dicarboxylic compound selected from (a) the diphenyl ester of an aromatic dicarboxylic acid, (b) the diphenyl ester of a heterocyclic dicarboxylic acid wherein the carboxyl groups are substituted on a carbon in a ring compound selected from the class consisting of pyridine, pyrazine, furan, quinoline, thiophene, and pyran, and (c) an anhydride of an aromatic dicarboxylic acid. Examples of polybenzimidazoles which have the repeating structure of formula (IIb) are as follows:

poly-2,2'-(m-phenylene)-5,5'-bibenzimidazole
poly-2,2'-(biphenylene-4",4")-5,5'-bibenzimidazole
poly-2.2'-(naphthalene-1",6")-5,5'-bibenzimidazole
poly-2,2'-pyridylene-3",5")-5,5'-bibenzimidazole A particularly useful example of a polyimidazole of formula (IIb) is PBI, poly-2,2'-(m-phenylene)-5,5'-bibenzimidazole, which is available in solution form (~26% polymer in DMAc) from PBI Performance Products, Inc. under the trade name Celazole®. This PBI has the chemical structure shown in formula (IIc):

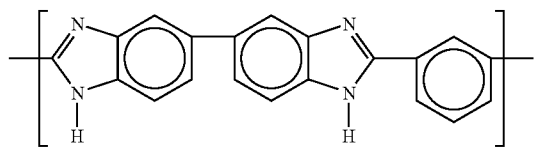

(IIc)

where, with reference to formula (IIb), $R^4$ would be formula S and $R^5$ would be formula U shown below:

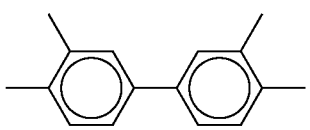

(S)

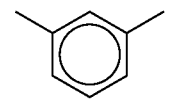

(U)

Any polymerization process known to those skilled in the art may be employed to prepare the polyimidazoles of this invention. Polymerization may be carried out in either solution or under molten states. The aromatic bis-o-diamines and dicarboxylates (such as acids, esters, and amides) conventionally used for synthesizing polyimidazoles are usually available commercially.

For membranes made from a blend of a polyimide or polyimides with a polyimidazole, the blend should preferably contain between 20-95% by mass polyimide, and 5-80% by mass polyimidazole.

Surprising, the blends of this invention are homogeneous over a broad range of compositions. The miscibility of the blends of this invention may be confirmed by the presence of single compositional dependent glass transition temperature lying between those of the constituent blend components. The glass transition temperature can be measured by Differential Scanning Calorimetry or Dynamic Mechanical Analysis.

The polyimides described herein are made by methods well known in the art. The polyimides can, for example, be conveniently made by polycondensation of an appropriate diisocyanate with approximately an equimolar amount of an appropriate dianhydride. Alternatively, the polyimides can be, for example, made by polycondensation of equimolar amounts of a dianhydride and a diamine to form a polyamic acid followed by chemical or thermal dehydration to form the polyimide. The diisocyanates, diamines, and dianhydrides useful for making the polyimides of interest are usually available commercially.

The polyimides and polyimidazoles should be of suitable molecular weight to be film forming and sufficiently pliable so as to be capable of being formed into continuous films or membranes.

The membranes of this invention are suitable for operating under the high pressures required for industrial separations. For example, membranes must be capable of withstanding a transmembrane pressure of 1500-2000 psi in many petrochemical operations, and up to 1500 psi in natural gas sweetening operations. Typical hollow-fiber membranes are susceptible to collapse under these conditions unless the walls of the hollow fiber are capable of withstanding the stresses caused by high pressure. Blending of polyimidazoles with the polyimides of this invention surprisingly increases the mechanical strength of the membranes, making them suitable for higher pressure applications.

The membranes of this invention are suitable for operating in solvent-rich environments without loss of selectivity. Polyimidazoles have very high solvent resistance making the blend membranes described here suitable for solvent pervaporation applications, vapor separations, or gas separations with condensable vapor contaminants.

Preferred polymers are soluble in a wide range of common organic solvents including most aprotic solvents that are typically used for the formation of polymeric membranes, such as N-methyl pyrrolidone ("NMP"), and N,N-dimethyl acetamide ("DMAC").

The polymers are usually glassy and rigid, and therefore, may be used to form a single-layer membrane of an unsupported film or fiber. Such single-layer films are normally too thick to yield commercially acceptable flux of the preferentially permeable component of the feed mixture. So, to be economically practical the separation membrane may comprise a very thin selective layer on a support layer to form a thicker structure. This may be, for example, an integral asymmetric membrane, comprising a dense skin region that forms the selective layer and a micro-porous support region. Such membranes are described, for example, in U.S. Pat. No. 5,015,270. As a further, and preferred, alternative, the membrane may be a composite membrane, that is, a membrane having multiple layers. Composite membranes typically comprise a porous but non-selective support membrane, which provides mechanical strength, coated with a thin selective layer of another material that is primarily responsible for the separation properties. Typically, such composite flat-film or hollow-fiber membranes are made by solution-casting (or spinning in the case of hollow fibers) the support membrane, then solution-coating the selective layer in a separate step. Alternatively, hollow-fiber composite membranes can be made by co-extrusion spinning of both the support material and the separating layer simultaneously as described in U.S. Pat. No. 5,085,676.

The membranes of this invention can be fabricated into a wide variety of membrane forms by appropriate conventional methods known to one of ordinary skill in the art. For illustrative purposes, a method to prepare membranes in accordance with this invention is generally described as follows. Polyimidazole in dry particulate form is dissolved in a suitable solvent such as DMAc at approximately about 20-30% polymer content under sufficiently high temperature, preferably in an autoclave. The polyimide in dry particulate form is also dissolved in a suitable solvent such as DMAc at approximately about 20-35% polymer content at moderate temperature. The two solutions are mixed together to obtain the polymer dope having the required total polymer content and polyimide:polyimidazole ratio. The polymer dope is cast as a sheet at the desired thickness onto a flat support layer (for flat sheet membranes), or extruded through a conventional hollow fiber spinneret (for hollow fiber membranes). If a uniformly dense membrane is desired, the solvent is slowly removed by heating or other means of evaporation. If an asymmetric membrane is desired, the film or fiber structure is quenched in a liquid that is a non-solvent for the polymer and that is miscible with the solvent for the polyimide. Alternatively, if a composite membrane is desired, the polymer is cast or extruded over a porous support of another material in either flat film or hollow fiber form. The separating layer of the composite membrane can be a dense ultra-thin or asymmetric film. Alternatively, hollow-fiber composite membranes can be made by co-extrusion spinning of both the support material and the separating layer simultaneously. So, in one embodiment the membrane may comprise a composite hollow fiber membrane that comprises a supporting core layer and a fluid-separating sheath layer made of the polyimide/polyimidazole blend.

The resulting membranes may be mounted in any convenient type of housing or vessel adapted to provide a supply of the feed fluid, and removal of the permeate and residue fluids. The vessel also provides a high-pressure side or first side (for the feed fluid and residue fluid) and a low-pressure or second side of the membrane (for the permeate fluid). For example, flat-sheet membranes can be stacked in plate-and-frame modules or wound in spiral-wound modules. Hollow-fiber membranes are typically potted with a thermoset resin in cylindrical housings. The final membrane separation unit comprises one or more membrane modules, which may be housed individually in pressure vessels or multiple elements may be mounted together in a sealed housing of appropriate diameter and length.

The fluids that are produced in industrial plants such as petrochemical plants and refineries that are to be separated may vary widely in composition and character. For example, such feed fluids may include, but are not limited to, the following fluids: carbon dioxide, carbon monoxide, sulfur containing gases such as hydrogen sulfide, paraffins, isoparaffins, olefins, argon, chlorine, hydrogen, methane, nitrogen, carbon monoxide, propylene, propane, hexane, and the like commonly found in gases from such sources. Of course, feed fluids from any other source and any other composition may be used as long as the membrane is not readily plasticized by any such impurities or other gases or condensates. Further, less selective and more durable membranes or other separation techniques known or used by one skilled in the art may be used to partially separate certain caustic or harmful fluids from the feed fluids prior to further separation and/or concentration by the membranes disclosed and used herein. Under a suitable driving force for permeation, such as imposing a pressure difference between the feed and permeate sides of the membrane, the more permeable component passes to the permeate side at higher rate than the less permeable component or components. For example hydrogen or carbon dioxide pass to the permeate or second side of the membrane at a higher rate than methane. This produces either a hydrogen-enriched stream or a carbon dioxide-enriched stream on the permeate side of the membrane. The hydrogen- or carbon dioxide-depleted residue, occasionally referred to as the "retentate", is withdrawn from the feed side or first side.

The novel process of this invention comprises various methods of using the membranes of this invention for fluid separation and/or enrichment. For example, the invention includes a method for processing a feed mixture of two or more fluids wherein the method comprises:

(a) providing a selectively permeable membrane wherein the membrane comprises a first side and a second side, wherein the membrane is made of a material comprising a blend of at least one polyimide polymer having the repeating units as shown in the formula (I), with at least one polyimidazole polymer having the repeating units as shown in formula (IIa) and formula (IIb).
 (b) contacting the first side of the membrane with a fluid feed mixture of at least two or more fluid components;
 (c) causing at least one component of the feed mixture to selectively permeate through the membrane, thereby forming on the second side of the membrane a permeate composition which has a concentration of at least one component that is greater than that of the the feed mixture;
 (d) removing from the second side of the membrane the permeate composition; and
 (e) withdrawing from the first side of the membrane a composition that has a concentration of at least one component that is less than that of the feed mixture.

The novel method can operate under a wide range of conditions and is thus adapted to accept feed streams supplied from a diverse range of sources. If the feed stream is a fluid that exists already at a sufficiently high above-atmospheric pressure and a pressure gradient is maintained across the membrane, the driving force for separation can be adequate without raising feed stream pressure farther. Otherwise, the feed stream can be compressed to a higher pressure, a vacuum can be drawn on the permeate or second side of the membrane, or a combination of both can be applied to provide adequate driving force. In one preferred embodiment, the driving force for separation is a pressure gradient across the membrane of about 0.14 to about 13.8 MPa (about 20 to about 2000 psi).

The polymer blends of the current invention are uniform and can be formed from the component polymers in conventional ways. For example, the component polymers can be synthesized separately and mixed in solution by dissolving each polymer in one or more suitable solvents. If the blend is solvent mixed, the solution can be stored or used directly in subsequent membrane fabrication steps. Homogeneity of the dry (i.e., solvent-free) blend can be checked by detecting only a single compositional dependent glass transition temperature lying between the glass transition temperatures of the constituent components or in a cruder manner by examining the clarity of dense films cast from solution. Differential scanning calorimetry and dynamic mechanical analysis can be used to measure glass transition temperature.

One preferred embodiment of the blend is formed by dissolving the component polymers in separate solutions, combining the solutions and 25 agitating the combined solutions to obtain a dissolved blend. Heating to temperatures in the range of about 50 to 200° C. can optionally be used to accelerate dissolution of the components. The individual components and the resulting blend are sufficiently soluble in solvents typically used for processing into suitable fluid separation membranes.

It is well known in the art that many chemically-different polymers are mutually incompatible and do not form homogeneous blends or form homogenous blends over a narrow compositional range; and, that it is difficult to predict the compatibility or miscibility of any pair of polymers. Surprisingly, and contrary to conventional wisdom, the polymer blends of this invention are miscible in a wide compositional range. For example, blend ratios of polyimide P84:polyimidazole PBI of 95:5 to 5:95 exhibit a single compositionally dependent glass transition temperature. Solutions of such blends are perfectly clear. Dense polymer films from such blends are optically clear.

Membranes of the current invention enable an attractive combination of carbon dioxide permeability and permselectivity for carbon dioxide over methane, nitrogen, and the like. The membranes exhibit little or no plasticization by carbon dioxide or aliphatic hydrocarbons, and are thus especially useful for the removal of carbon dioxide from industrially significant fluid streams, such as in natural gas sweetening. Even at high operating pressure, membranes prepared from such polyimide blends possess an excellent balance of fluid permeation rates and selectivity of one fluid over other fluids in the multi-component fluid mixture.

EXAMPLES

This invention is now illustrated by examples of certain representative, non-limiting embodiments thereof, wherein all parts, proportions and percentages are by weight unless otherwise indicated.

Dense Film Testing

A solution of 26% PBI in DMAc was obtained from PBI Performance Products, Inc. 20% P84 was dissolved in NMP. This solution was then mixed with 26.% PBI in DMAc. The relative solution amounts were adjusted so that the polymer (w/w) ratio of PBI:P84 was 5/95, 32/68, 53/47 and 78/22. All four solutions were clear. Films cast from these solutions by knife casting on glass placed on a 80°-90° C. hot plate were also clear, indicating that these polymers are miscible over a wide range.

As best shown in the FIGURE, DSC was used to confirm molecular scale miscibility of these blends. Samples of cast films from the blends above were run on the DSC. Only one $T_g$ was observed. In order to improve the sensitivity of the DSC detection, we also examined the blend after conversion to powder form. The 53/47 PBI:P84 solution was precipitated in an excess of MeOH. The fine powder precipitate was recovered and washed several times with more MeOH on a filter paper. The washed powder was then dried for ~2 weeks in a 100° C. vacuum oven. The DSC trace again showed only one $T_g$ for the blend; the observed $T_g$ of 380° C. agrees well with the Fox equation prediction for miscible blends.

Hollow Fiber Examples

Example 1

Composite Fiber Spinning with a Composition Having a 3:1 Ratio Blend of P84:PBI

A core solution was made of 31.5% P84 in NMP with 0.5% (by weight of the polymer) maleic anhydride. Another solution of P84 in DMAc was prepared and combined with the 26% solution of PBI in DMAc obtained from PBI Performance Products, Inc. in order to form a sheath solution consisting of 27% total polymer in DMAc with P84:PBI of 3:1 (w/w). A bore solution was made with γ-butyrolactone:water 85:15 (w/w). The three solutions were extruded through a composite spinneret (22/10 mils OD/ID) with flow ratios of core:sheath:bore solutions of 135:13:47 and taken up at 90 m/min. The spun fiber was washed, dehydrated by methanol/hexane solvent exchange and dried to form a hollow fiber with ~150/60 μm OD/ID. Post-treatment (PT) may be performed. The fiber performance summarized in Table 1 shows very high selectivity (He/$N_2$>400) after a simple Sylgard post-treatment. Sylgard post-treatment is done by soaking the fiber in a solution of 2% Sylgard 184 or Sylgard 2577 in i-octane; pouring away the solution and drying the fiber. "Reactive" post-treatment is a more complex way of caulking the fiber surface using a reactive chemistry as described in U.S. Pat. No. 5,091,216. By contrast, P84 based un-postreated fibers (UPT) have He/$N_2$ selectivity ~250 (which is also a relatively high value).

TABLE 1

Composite fiber prepared from sheath layer with 3:1 blend of P84:PBI

Core-: 31.5% P84 in NMP

| | Spin. | Bath | | Sheath = 27% P84:PBI (3:1) in DMAc | | | |
|---|---|---|---|---|---|---|---|
| | Temp. | Temp. | Gap | UPT | | PT | PT |
| Mod # | C. | C. | cm | He GPU | He/$N_2$ Sel | method | He GPU | He/$N_2$ Sel |
| 06-17-1 | 90 | 9 | 5 | 154 | 75 | 2% 2577 | 101 | 425 |
| 6-17-2 | 90 | 9 | 2.5 | 178 | 43 | 2% 184 | 103 | 355 |
| 6-17-3 | 76 | 10 | 5 | 224 | 28 | | | |
| 6-17-4 | 76 | 10 | 2.5 | 217 | 15 | reactive | 93 | 450 |
| 6-17-5 | 76 | 21 | 2.5 | 220 | 21 | 2% 2577 | 98 | 176 |
| 6-17-6 | 76 | 21 | 5 | 233 | 21 | 2% 184 | 128 | 298 |
| 6-17-7 | 76 | 30 | 5 | 314 | 33 | 2% 2577 | 147 | 492 |
| 6-17-8 | 76 | 30 | 2.5 | 269 | 8 | reactive | 98 | 177 |

GPU = Gas Permeation Units ($10^{-6}$ $cm^3$ (STP)/$cm^2$ · sec · cm Hg)
Sel = Selectivity

Example 2

Composite Fiber Spinning with P84:PBI=95:5 Composition

A second spin (shown in Table 2) was done similar to the procedure described above with the difference that the sheath solution contained 27.5% total polymer with a 95:5 P84:PBI composition. This sheath was made by mixing a solution of P84 in NMP with the 26% stock solution of PBI in DMAc. All the fiber in this spin was Sylgard-184 post-treated. The results in Table 2 show that highly selective composite fiber can be made by spinning at high spinneret temperature. At lower spinneret temperature, the fiber can be made with attractive flux/selectivity combination.

TABLE 2

Composite fiber prepared from 95:5 blend of P84:PBI sheath layer

Core-: 31.5% P84 in NMP

| | Spin. Temp. °C. | Bath Temp. °C. | Gap cm | Sheath = 27.5% P84:PBI (95:5) in NMP/DMAc | | | | |
|---|---|---|---|---|---|---|---|---|
| | | | | UPT | | PT | PT | |
| Mod # | | | | He GPU | He/$N_2$ Sel | method | He GPU | He/$N_2$ Sel |
| 06-18-1 | 85 | 22 | 5 | 500 | 20.7 | 2% 184 | 214 | 1056 |
| 6-18-2 | 85 | 22 | 2.5 | 715 | 7.1 | 2% 184 | 258 | 518 |
| 6-18-3 | 75 | 22 | 2.5 | 1063 | 3.6 | 2% 184 | 276 | 247 |
| 6-18-4 | 75 | 22 | 5 | 1365 | 3.0 | 2% 184 | 251 | 133 |
| 6-18-8 | 86 | 39 | 5 | 3505 | 3.1 | 2% 184 | 374 | 157 |
| 6-18-9 | 86 | 39 | 2.5 | 7237 | 3.0 | 2% 184 | 428 | 66 |
| 6-18-10 | 86 | 39 | 1 | 883 | 7.2 | 2% 184 | 328 | 222 |

GPU = Gas Permeation Units ($10^{-6}$ $cm^3$ (STP)/$cm^2$ · sec · cm Hg)
Sel = Selectivity

Example 3

Monolithic Fiber with P84:PBI Blend of 50:50

A solution was made by adding P84 and DMAc to the 26% stock solution of PBI in DMAc in order to get a final solution of 31% total polymer with a P84:PBI ratio of 1:1 (w/w). This solution was spun through a monolithic spinneret (22/10 mils OD/ID) at 85° C. with a gap setting of 2.5 cm, using a bore solution of γ-butyrolactone:water 85:15 (w/w), and taken up at 90 m/min. The spun fiber was washed, dehydrated by methanol/hexane solvent exchange and dried to form a hollow fiber with ~148/55 μm OD/ID.

The permeation test results are shown in Table 3. The uncoated fiber has a fairly integral skin. After Sylgard post-treatment, the N2 permeance through the fiber was too low to be measured. Measurements at higher temperature (50° and 90° C.) show retention of high selectivity.

TABLE 3

Monolithic fiber prepared from 1:1 blend of P84:PBI

| | Temperature ° C. | He GPU | He/$N_2$ Sel |
|---|---|---|---|
| Uncoated | 20 | 15-17 | 100-87 |
| Sylgard coated | 20 | ~7 | >800 |
| | 50 | 15-18 | 380-311 |
| | 90 | 34-40 | 210-220 |

GPU = Gas Permeation Units ($10^{-6}$ $cm^3$ (STP)/$cm^2$ · sec · cm Hg)
Sel = Selectivity Although the present invention has been described in considerable detail with reference to certain preferred versions and examples thereof other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A membrane for fluid separation made of a material comprising a blend of:
   a polyimide polymer; and
   a polyimidazole polymer;
   wherein said polyimide polymer comprises a plurality of repeating units represented by formula (I)

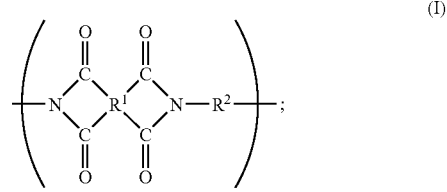

wherein each $R^2$ is independently selected from the group consisting of formula (A), formula (B), and formula (C)

(A)

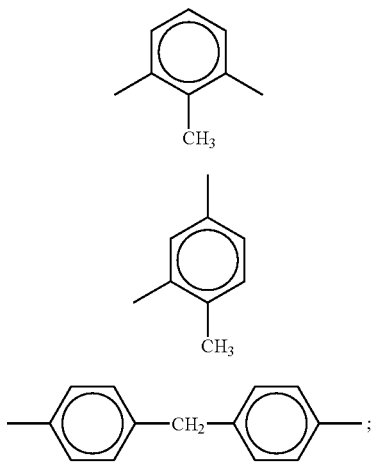

(B)

(C)

wherein each $R^1$ is independently selected from the group consisting of formula (Q), formula (S), and formula (T)

(Q)

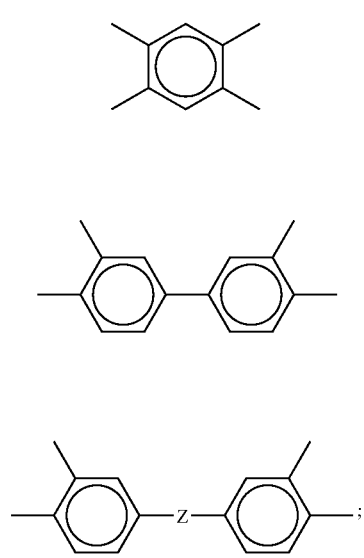

(S)

(T)

wherein each Z is independently selected from the group consisting of formula (L), formula (M), and formula (N)

(L)

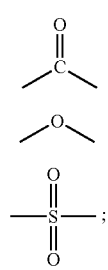

(M)

(N)

wherein said polyimidazole polymer comprises repeating units selected from the group consisting of formula (IIa) and formula (IIb)

(IIa)

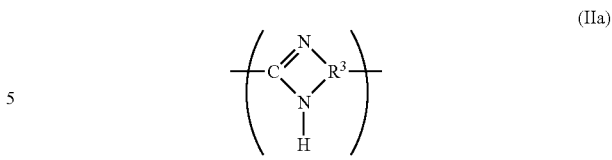

(IIb)

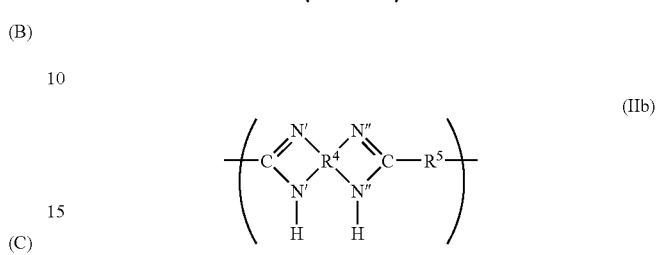

wherein $R^3$ of formula (IIa) is an aromatic group, the two nitrogen atoms of formula (IIa) being bonded to adjacent carbon atoms of $R^3$;

wherein $R^4$ of formula (IIb) is an aromatic group, the two N' atoms being bonded to one set of adjacent carbon atoms of $R^4$, the two N" atoms being bonded to another set of adjacent carbon atoms of $R^4$; and wherein $R^5$ of formula (IIb) is an aromatic, aliphatic or heterocyclic group.

2. The membrane of claim 1, wherein the polyimidazole comprises repeating units of formula IIb, $R^4$ is a biphenyl group, and $R^5$ is a phenyl group.

3. The membrane of claim 1, wherein said polyimide polymer comprises repeating units of formula (Ia)

(Ia)

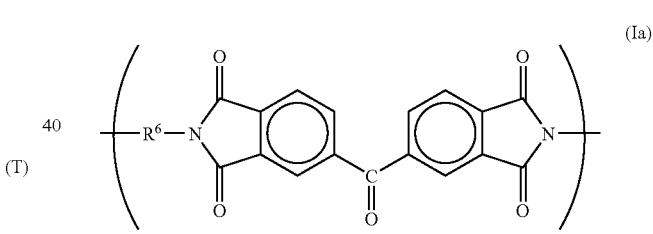

wherein each $R^6$ is independently selected from the group consisting of said formula (A), said formula (B), and said formula (C).

4. The membrane of claim 1, wherein said polyimide polymer comprises repeating units of formula (Ia)

(Ia)

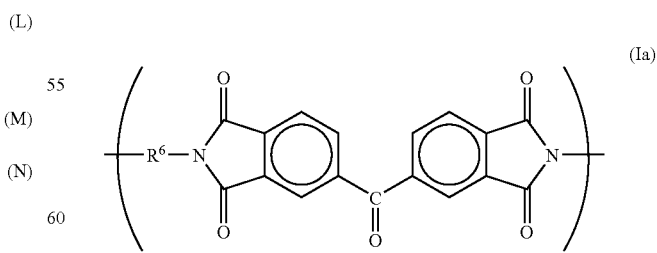

wherein $R^6$ in said polyimide polymer of formula (Ia) comprises about 10-25% of the repeating unit of formula (A), about 55-75% of the repeating unit of formula (B), and about 20-40% of the repeating unit of formula (C).

5. The membrane of claim 1, wherein said polyimide polymer comprises repeating units of formula (Ia)

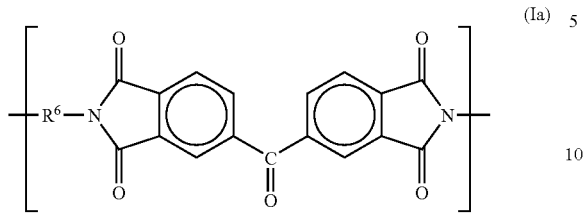

wherein $R^6$ in said polyimide polymer of formula (Ia) comprises about 16% of the repeating unit of formula (A), about 64% of the repeating unit of formula (B), and about 20% of the repeating unit of formula (C).

6. The membrane of claim 1, wherein said polyimide polymer comprises repeating units of formula (Ib)

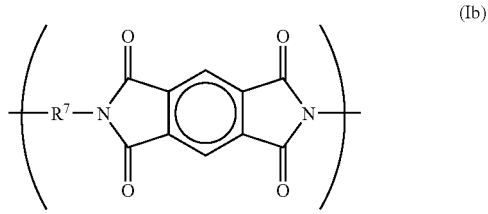

wherein each $R^7$ is independently selected from the group consisting of said formula (A) and said formula (B).

7. The membrane of claim 1, wherein:
said polyimide polymer comprises a plurality of repeating units of formula (Ia) and a plurality of repeating units of formula (Ib)

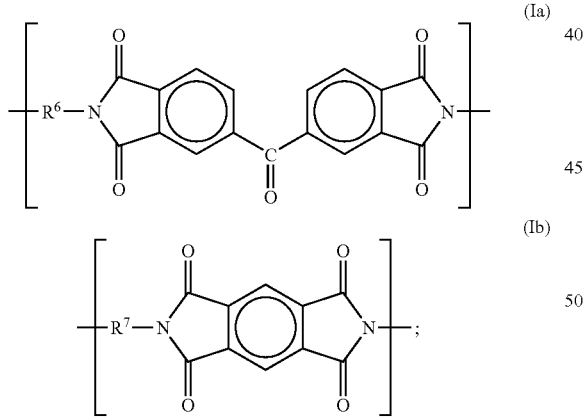

said repeating units of formula (Ib) constitute about 1-99% of a total of the repeating units of formulae (Ia) and (Ib);
1-99% of the $R^6$s in said formula Ia is the structure of said formula (A) and 99-1% of the $R^6$s in said formula Ia is the structure of said formula (B) such that the total of $R^6$s that are the structures of formulae (A) or (B) is 100%; and
1-99% of the $R^7$s in said formula Ib is the structure of said formula (A) and 99-1% of the $R^7$s in said formula Ib is the structure of said formula (B) such that the total of $R^7$s that are the structures of said formulae (A) or (B) is 100%.

8. The membrane of claim 7, wherein:
10-30% of the $R^6$s in said formula Ia is the structure of said formula (A) and 90-70% of the $R^6$s in said formula Ia is the structure of said formula (B) such that the total of $R^6$s that are the structures of formulae (A) or (B) is 100%;
10-30% of the $R^7$s in said formula Ib is the structure of said formula (A) and 90-70% of the $R^7$s in said formula Ib is the structure of said formula (B) such that the total of $R^7$s that are the structures of said formulae (A) or (B) is 100%; and
said repeating units of formula (Ib) constitute about 30-50% of a total of the repeating units of formulae (Ia) and (Ib).

9. The membrane of claim 7, wherein:
about 20% of the $R^6$s in said formula Ia is the structure of said formula (A) and about 80% of the $R^6$s in said formula Ia is the structure of said formula (B) such that the total of $R^6$s that are the structures of formulae (A) or (B) is 100%;
about 20% of the $R^7$s in said formula Ib is the structure of said formula (A) and about 80% of the $R^7$s in said formula Ib is the structure of said formula (B) such that the total of $R^7$s that are the structures of said formulae (A) or (B) is 100%; and
said repeating units of formula (Ib) constitute about 40% of a total of the repeating units of formulae (Ia) and (Ib).

10. The membrane of claim 1 wherein a mass ratio of said polyimide polymer to said polyimidazole is at least about 1.0.

11. The membrane of claim 1, wherein a mass ratio of said polyimide polymer to said polyimidazole is at least about 2.0.

12. The membrane of claim 1, wherein said membrane comprises between about 20-95% mass of said polyimide polymer.

13. The membrane of claim 1, wherein said polyimide polymer is the polycondensation reaction product of an aromatic diisocyanate and a dianhydride, the aromatic diisocyanate being selected from the group consisting of 2,4-toluenediisocyanate, 2,6-toluenediisocyanate, and 4,4'-methylene-bis (phenylisocyanate), the dianhydride being selected from the group consisting of pyromellitic dianhydride, benzophenonetetracarboxylic dianhydride, 3,3',4,4'-diphenylsulfone tetracarboxylic dianhydride, 3,3',4,4'-biphenyl tetracarboxylic dianhydride, and mixtures thereof.

14. The membrane of claim 1, wherein said membrane has a configuration selected from the group consisting of an asymmetric membrane, a uniformly dense membrane, a hollow fiber membrane, and a composite membrane.

15. The membrane of claim 1, wherein the membrane is configured as a plurality of composite hollow fibers, each of the fibers having a supporting core layer surrounded by a fluid-separating sheath layer, the fluid-separating sheath layer comprised of the material made of the blend of the polyimide and polyimidazole.

16. A method of separating one or more fluids from a fluid mixture comprising the steps of:
(a) providing the fluid separation membrane of claim 1;
(b) contacting a fluid mixture with a first side of said fluid separation membrane thereby causing a preferentially permeable fluid of said fluid mixture to permeate said fluid separation membrane faster than a less preferentially permeable fluid to form a permeate fluid mixture enriched in said preferentially permeable fluid on a second side of said fluid separation membrane and a retentate fluid mixture depleted in said preferentially permeable fluid on said first side of said fluid separation membrane, and (c) separately withdrawing said permeate fluid mixture and said retentate fluid mixture.

17. The method of claim 16, wherein said polyimidazole polymer is 2,2'-(m-phenylene)-5,5'-bibenzimadazole.

18. The method of claim 16, wherein a pressure gradient across said membrane is in the range of about 20 to about 2000 psi.

19. The method of claim 16, wherein a membrane operating temperature is >50° C.

20. The method of claim 16, wherein:
the fluid mixture comprises air;
the permeate fluid is enriched in oxygen; and
the retentate fluid mixture is depleted in oxygen.

21. The method of claim 16, wherein:
the fluid mixture comprises a mixture of carbon dioxide and methane;
the permeate fluid is enriched in carbon dioxide; and
the retentate fluid mixture is depleted in carbon dioxide.

22. The method of claim 16, wherein:
the fluid mixture comprises a mixture of carbon dioxide and nitrogen;
the permeate fluid is enriched in carbon dioxide; and
the retentate fluid mixture is depleted in carbon dioxide.

23. The method of claim 16, wherein:
the fluid mixture comprises a mixture of hydrogen and methane;
the permeate fluid is enriched in hydrogen; and
the retentate fluid mixture is depleted in hydrogen.

24. The method of claim 16, wherein:
the fluid mixture comprises a mixture of hydrogen and carbon monoxide;
the permeate fluid is enriched in hydrogen; and
the retentate fluid mixture is depleted in hydrogen.

25. The method of claim 16, wherein:
the fluid mixture comprises a mixture of water and a C1-C4 alcohol selected from the group consisting of ethanol, propanol, isopropanol, butanol, and mixtures thereof;
the permeate fluid is enriched in water; and
the retentate fluid mixture is depleted in water.

26. The method of claim 16, wherein:
the fluid mixture comprises a mixture of an unsaturated $C_2$-$C_4$ hydrocarbon and a branched or straight chain $C_2$-$C_4$ paraffin;
the permeate fluid is enriched in the unsaturated hydrocarbon; and
the retentate fluid mixture is depleted in the unsaturated hydrocarbon.

* * * * *